US010820479B2

(12) United States Patent
Ling et al.

(10) Patent No.: US 10,820,479 B2
(45) Date of Patent: Nov. 3, 2020

(54) SEED ABLATION

(71) Applicants: THE UNIVERSITY OF WESTERN AUSTRALIA, Nedlands, Western Australia (AU); BOTANICAL GARDENS AND PARKS AUTHORITY, West Perth, Western Australia (AU)

(72) Inventors: King Ling, Bateman (AU); Andrew Louis Guzzomi, Palmyra (AU); Todd Erickson, Inglewood (AU); David Merritt, North Perth (AU); Kingsley Wayne Dixon, City Beach (AU)

(73) Assignee: THE UNIVERSITY OF WESTERN AUSTRALIA, Nedlands, Western Australia (AU)

( * ) Notice: Subject to any disclaimer, the term of this patent is extended or adjusted under 35 U.S.C. 154(b) by 366 days.

(21) Appl. No.: 15/580,947

(22) PCT Filed: Jun. 10, 2016

(86) PCT No.: PCT/AU2016/000202
§ 371 (c)(1),
(2) Date: Dec. 8, 2017

(87) PCT Pub. No.: WO2016/197184
PCT Pub. Date: Dec. 15, 2016

(65) Prior Publication Data
US 2018/0177117 A1 Jun. 28, 2018

(30) Foreign Application Priority Data
Jun. 10, 2015 (AU) .................................. 2015902194

(51) Int. Cl.
*A01C 1/00* (2006.01)
*A01F 12/44* (2006.01)
(Continued)

(52) U.S. Cl.
CPC .................. *A01C 1/00* (2013.01); *A01C 1/06* (2013.01); *A01F 12/42* (2013.01); *A01F 12/44* (2013.01)

(58) Field of Classification Search
CPC ........... A01C 1/00; A01F 12/42; A01F 12/442
(Continued)

(56) References Cited

U.S. PATENT DOCUMENTS

| 80,593 A * | 8/1868 | Brown ..................... A01G 7/00 47/58.1 R |
| 354,109 A * | 12/1886 | Dudley .................... A01G 7/00 47/58.1 R |

(Continued)

FOREIGN PATENT DOCUMENTS

JP 2006288245 A 10/2006

OTHER PUBLICATIONS

International Search Report and Written Opinion dated Aug. 17, 2016 from International Application No. PCT/AU2016/000202, 11 pages.

Primary Examiner — Christopher D Hutchens
(74) Attorney, Agent, or Firm — MH2 Technology Law Group, LLP

(57) ABSTRACT

The present invention relates to an apparatus and method for seed ablation. In accordance with the method of seed ablation, the apparatus is adapted to expose a heat source to a plurality of seeds while the seeds are in motion. Exposing of the heat source to the moving seed allows ablation of the seeds for de-awning and removing of the appendages of the seeds. In a particular arrangement the seeds are exposed to rotational movement within a centrifugal drum to form a rotating stream of seeds. A torch which reaches into the drum provides a flame directed to the stream of seeds for exposing the seeds to the flame. This allows the ablation of (Continued)

the seed awns and appendages over time as seeds enter into contact with the flame.

20 Claims, 19 Drawing Sheets

(51) Int. Cl.
*A01F 12/42* (2006.01)
*A01C 1/06* (2006.01)

(58) Field of Classification Search
USPC .......................................... 47/DIG. 9
See application file for complete search history.

(56) References Cited

U.S. PATENT DOCUMENTS

| | | | | |
|---|---|---|---|---|
| 4,259,764 A | * | 4/1981 | Downing | D01B 1/04 19/41 |
| 4,359,839 A | * | 11/1982 | Loiseau | A01F 12/42 99/483 |
| 5,119,589 A | * | 6/1992 | Rowse | A01C 1/02 47/1.01 R |
| 7,487,892 B1 | * | 2/2009 | Hirsch | G01F 13/001 222/240 |
| 2002/0121047 A1 | | 9/2002 | Thrash | |

* cited by examiner

Table 1: Coating Recipe Applied to Triodia (Spinifex) Grass seeds

| | Species | Seed Volume (ml) | Seed Weight (g) | Dry Seed Weight (g) |
|---|---|---|---|---|
| | Triodia (Spinifex) | 250 | 29.7 | 29.7 |
| | Product | Active Ingredient | Weight (g) | Dry Weight (g) |
| Step 1 | Selvol-205 | Polyvinyl Alcohol | 22 | 1.76 |
| | Omyacarb | Calcium Carbonate | 90 | 90 |
| Step 2 | Selvol-205 | Polyvinyl Alcohol | 22.7 | 1.82 |
| | Omyacarb | Calcium Carbonate | 108.64 | 108.6 |
| | | | | Total: 231.88 |

Figure 5

| Code | Heat Treatment | Code | Heat Treatment |
|---|---|---|---|
| Ctrl | Control (0 Sec Heat) | Ctrl | Control (0 Sec Heat) |
| 1 | 60 Sec Heat | 5 | 3 Min Continuous |
| 2 | 3 Min Heat/15 Sec Interval | 6 | 6 Min Heat/15 Sec Intervals |
| 3 | 3 Min Heat/30 Sec Interval | 7 | 6 Min Heat/30 Sec Intervals |
| 4 | 3 Min Heat/60 Sec Interval | 8 | 6 Min Heat/60 Sec Intervals |

Figure 13

| Code | Heat Interval | Solution | Average | Median | Average % | Median % |
|---|---|---|---|---|---|---|
| Ctrl | Control | H2O | 1 | 2 | 100% | 100% |
| 2, 6 | 15 Seconds | H2O | 7.5 | 12 | 750% | 600% |
| 3, 7 | 30 Seconds | H2O | 5 | 6 | 500% | 300% |
| 1, 4, 8 | 60 Seconds | H2O | 2.7 | 5.7 | 267% | 283% |
| 5 | 3 Minutes | H2O | 0 | 0 | 0% | 0% |
| Ctrl | Control | KAR | 4 | 7 | 100% | 100% |
| 2, 6 | 15 Seconds | KAR | 15.0 | 21.0 | 375% | 300% |
| 3, 7 | 30 Seconds | KAR | 12 | 15.5 | 300% | 221% |
| 1, 4, 8 | 60 Seconds | KAR | 4.7 | 10.3 | 117% | 148% |
| 5 | 3 Minutes | KAR | 1 | 5 | 25% | 71% |

Figure 14

| Code | Total Heat Time | Solution | Average | Median | Average % | Median % |
|---|---|---|---|---|---|---|
| Ctrl | Control | H2O | 1 | 2 | 100% | 100% |
| 1 | 60 Seconds | H2O | 1 | 3 | 100% | 150% |
| 2, 3, 4 | 3 Minutes | H2O | 4.3 | 8.3 | 433% | 417% |
| 6, 7, 8 | 6 Minutes | H2O | 6.3 | 8.3 | 633% | 417% |
| Ctrl | Control | KAR | 4 | 7 | 100% | 100% |
| 1 | 60 Seconds | KAR | 1 | 8 | 25% | 114% |
| 2, 3, 4 | 3 Minutes | KAR | 9.7 | 13.7 | 242% | 195% |
| 6, 7, 8 | 6 Minutes | KAR | 12.7 | 18 | 317% | 262% |

Figure 15

| ID | Sample Details | ID | Sample Details |
|---|---|---|---|
| Ctrl | Control (0 Sec Heat) | Ctrl | Control (0 Sec Heat) |
| 1 | 180 RPM, 2.5 cm, pencil flame | 5 | 180 RPM, 5 cm, pencil flame |
| 2 | 180 RPM, 2.5 cm, large flame | 6 | 180 RPM, 5 cm, large flame |
| 3 | 360 RPM, 2.5 cm, pencil flame | 7 | 360 RPM 5 cm, pencil flame |
| 4 | 360 RPM, 2.5 cm, large flame | 8 | 360 RPM, 5 cm, large flame |

Figure 18

| Samples | Sample Details | Media | Mean Germination (%) | | Percentage of Control (%) | |
|---|---|---|---|---|---|---|
| Ctrl | Control | H2O | 3 | 4 | 100% | 100% |
| 1, 2, 5, 6 | 180 RPM | H2O | 13 | 15.5 | 433% | 388% |
| 3, 4, 7, 8 | 360 RPM | H2O | 9.0 | 11.5 | 300% | 288% |
| Ctrl | Control | KAR | 5 | 6 | 100% | 100% |
| 1, 2, 5, 6 | 180 RPM | KAR | 12 | 16 | 240% | 267% |
| 3, 4, 7, 8 | 360 RPM | KAR | 15.0 | 22.0 | 300% | 367% |

Figure 19

| Samples | Sample Details | Media | Mean Germination (%) | | Percentage of Control (%) | |
|---|---|---|---|---|---|---|
| Ctrl | Control | H2O | 3 | 4 | 100% | 100% |
| 1, 2, 3, 4 | 2.5 cm | H2O | 11.75 | 13.5 | 392% | 338% |
| 5, 6, 7, 8 | 5 cm | H2O | 10.3 | 13.5 | 342% | 338% |
| Ctrl | Control | KAR | 5 | 6 | 100% | 100% |
| 1, 2, 3, 4 | 2.5 cm | KAR | 12.5 | 17.75 | 250% | 296% |
| 5, 6, 7, 8 | 5 cm | KAR | 14.5 | 20.25 | 290% | 338% |

Figure 20

| Cell | Treatment | Fluid | Week 3 | Week 4 | Week 3 | Week 4 |
|---|---|---|---|---|---|---|
| Ctrl | Control | H2O |  |  | 100% | 100% |
| 1, 3, 5, 7 | Pencil flame | H2O | 10.75 |  | 358% | 350% |
| 2, 4, 6, 8 | Large flame | H2O | 11.5 |  | 375% | 325% |
| Ctrl | Control | KAR |  |  | 100% | 100% |
| 1, 3, 5, 7 | Pencil flame | KAR | 13.25 |  | 442% | 292% |
| 2, 4, 6, 8 | Large flame | KAR | 13.8 |  | 458% | 342% |

| Cell | Treatment | Fluid | Week 3 | Week 4 | Week 3 | Week 4 |
|---|---|---|---|---|---|---|
| Ctrl | Control | H2O |  |  | 100% | 100% |
| 1 to 8 | Flamed | H2O | 11.0 |  | 367% | 338% |
| Ctrl | Control | KAR |  |  | 100% | 100% |
| 1 to 8 | Flamed | KAR | 13.5 |  | 270% | 317% |

| # | Volume (gallons) | Weight (lbs) | Bulk Density (lbs/in³) |
|---|---|---|---|
| 1 | 190 | 20 | 0.105 |
| 2 | 189 | 20 | 0.106 |
| 3 | 188 | 20 | 0.106 |
| 4 | 189 | 20 | 0.106 |
| 5 | 187 | 20 | 0.107 |
| 6 | 189 | 20 | 0.106 |
| 7 | 189 | 20 | 0.106 |
| 8 | 188 | 20 | 0.106 |

Figure 26

| # | Volume (gallons) | Weight (lbs) | Bulk Density (lbs/in³) |
|---|---|---|---|
| 1 | 120 | 18.6 | 0.155 |
| 2 | 122 | 18.5 | 0.152 |
| 3 | 121 | 18.4 | 0.152 |
| 4 | 119 | 18.5 | 0.155 |
| 5 | 118 | 18.2 | 0.154 |
| 6 | 123 | 18.2 | 0.148 |
| 7 | 121 | 18.3 | 0.151 |
| 8 | 124 | 18.4 | 0.148 |

Figure 27

| # | % Volume Change | % Weight Change | % Density Change |
|---|---|---|---|
| 1 | -37% | -7.0% | +47% |
| 2 | -35% | -7.5% | +43% |
| 3 | -36% | -8.0% | +43% |
| 4 | -37% | -7.5% | +47% |
| 5 | -37% | -9.0% | +44% |
| 6 | -35% | -9.0% | +40% |
| 7 | -36% | -8.5% | +43% |
| 8 | -34% | -8.0% | +39% |
| Average | -35.9% | -8.1% | +43.4% |

Figure 28

SEED ABLATION

CROSS-REFERENCE TO RELATED APPLICATIONS

This application is a U.S. National Stage application of PCT/AU2016/000202 filed 10 Jun. 2016, which claims priority to Australian Application No. 2015902194 filed 10 Jun. 2015, the entire disclosures of which are hereby incorporated by reference in their entireties.

TECHNICAL FIELD

The present invention relates to methods and apparatus to allow for pre-treating and pre-conditioning of seeds prior to use. When referring to seeds, this can be in the form of seeds or seeds contained in fruits, capsules or their natural dispersal unit (hereafter referred to as 'seed/s' unless stated otherwise).

The invention has been devised particularly, although not necessarily solely, in relation to a method and apparatus for removing appendages that enclose, encase, retain or are attached to seeds.

BACKGROUND ART

The following discussion of the background art is intended to facilitate an understanding of the present invention only. The discussion is not an acknowledgement or admission that any of the material referred to is or was part of the common general knowledge as at the priority date of the application.

Seeds are essential for food production, conservation of plant diversity, and for re-vegetation of areas of land that have been altered, for example, for farming, prospecting and mining, oil or gas production purposes. The process of obtaining, storing, and distributing the seeds is an essential part of food production, conservation, and re-vegetation processes.

The process for obtaining, storing, and distributing seeds can be an expensive exercise. This is typically true for large scale food production and re-vegetation of large areas of land that include, but not limited to, proper collection, handling, and transportation techniques.

Some particular types of seeds include dispersal unit appendages such as remnant floral bracts, awns, surface hairs and/or bristles. Seeds with these appendages are referred to being "bulky", "chaffy", and "fluffy" seeds (hereafter referred to as "bulky"). Examples of such seeds are commonly found in grass (Poaceae) seeds where they are enclosed in indehiscent floral bracts that can have many of the above mentioned appendages.

Typically, bulky seeds when stored occupy a large volume; this is because of the presence of the appendages. Thus, storage of large quantities of bulky seeds can be cumbersome due to excessive storage areas that are required. The same problems arise during handling and transportation of the seeds. For instance, transportation of a relative large number of seeds can be made difficult due to the relative large volume that the bulky seeds occupy. Another disadvantage of bulky seeds is that these seeds are relatively difficult to disperse during sowing of the seeds both manually and through mechanised means; in particular, when sowing is conducted outdoors under adverse weather and field conditions (e.g. windy conditions).

Solutions have been developed to reduce or minimize the bulky characteristics of seeds. For instance, a solution to aid in dispersal is coating the seeds with filler materials and binders using seed coating and pelleting technologies. Coating or pelleting bulky seeds removes the detrimental effects of the appendages. Initial coating trials conducted on *Triodia* (*Spinifex*) seeds encased in the natural dispersal unit using a rotary coater showed that it appears to possess relatively large repellency and general poor adhesion of the coating material to the seeds. Upon closer inspection of the seeds, it has been noted that the repellency, poor adhesion and incompleteness of the coating/pellet is exasperated due to the appendages of the grass seeds; in particular, this repellency, poor adhesion and incompleteness is noted on the hairs and awn tips of the seeds. This is because the hairs and awn tips protrude from the main seed unit and are flexible. Hence, successful coating on the hairs and awn tips of the seeds is problematic and reduce the final integrity of the coat. For example, the polymer seed coat is susceptible to cracking when the appendages flex under impacts during handling, storage, transportation and sowing of the seeds. Chips and cracks in the coating are particularly detrimental to the seed sowers as the seeds could entangle.

Due to the above-mentioned drawbacks of the coating process, an efficient method for de-awning and removal of the appendages of the seeds is required. This is particularly true because de-awning or awn-minimisation and appendage removal will remove the "bulky" characteristics of the seeds, increasing the coatability of the seeds.

It is against this background that the present invention has been developed.

SUMMARY OF INVENTION

According to a first aspect of the invention there is provided a method for ablating seeds, the method comprises the step of exposing at least one seed to at least one heat source, wherein the seed is in motion.

In a particular arrangement, the method further comprises generating a moving stream of seeds.

Preferably, the stream of seeds is exposed to the beat source.

Preferably, a particular location of the stream of seeds is exposed to the heat source.

Preferably, the heat source comprises a flame that comprises a pre-combustion zone, a main reaction zone and a post-combustion zone.

Preferably, the flame comprises propane gas flame.

Alternatively, other fuel types and heat sources are also possible

Preferably, the flame is a pencil shaped flame directed at one point of the stream of seeds.

In a particular arrangement, the flame has a width of 15 mm.

In another arrangement, the flame has width of 35 mm.

In a particular arrangement, the flame is a pencil shaped flame of about 38.1 mm to 50.8 mm long.

In another arrangement, the flame is a large volume flame.

In a further arrangement, the flame comprises a cyclone flame.

In one arrangement, the particular location of the stream of seeds is exposed simultaneously to the pre-combustion zone, the main reaction zone and the post-combustion zone of the flame.

In another arrangement, the stream of seeds is exposed simultaneously to the main reaction zone and the post-combustion zone.

Preferably, the cross-sectional area of the flame is sufficient to expose the whole stream of seeds over multiple rotations of the seed mass to the main reaction zone.

Preferably, the cross-sectional area of the flame is about 20 mm×20 mm.

Preferably, the flame is generated by a torch.

In a particular arrangement, the torch comprises a flame spreader.

Preferably, the distance of the torch should be such that the contact between stream of seeds and combustion zone is maximised.

Preferably, the distance between the torch tip and the outer surface of the stream of seeds is between about 2.5 cm to 5 cm.

Preferably, the seeds are exposed to the flame for 0.003 seconds or 0.009 seconds.

Preferably, the stream of seeds is generated in a rotating drum.

Preferably, the drum has a diameter of 334 mm and a height of 200 mm.

In an alternative arrangement, the drum has a diameter of 883 mm and a height of 600 mm.

Preferably, the rotating speed of the drum can be adjusted to alter the flow and speed of the stream of seeds Preferably the rotating speed of the 334 mm diameter drum is between about 120 to 600 rpm.

In an arrangement, the rotating speed of the drum is approximately 360 rpm, exposing the particular location of the stream of seeds to the flame for approximately 0.003 seconds.

In another arrangement, the rotating speed of the drum is approximately 180 rpm, exposing the stream of seeds to the flame for approximately 0.009 seconds.

Preferably, the rotating speed of the 883 mm diameter drum is between about 86 to 100 rpm.

Preferably, each seed of toe stream of seeds, after the stream is exposed to the heat source for a set duration, is ablated sufficiently (e.g. removal of unwanted hairs and awns) to allow greater coatability.

Preferably, each seed of the stream of seeds, is coated after the stream is exposed to the heat source In an arrangement, the seed stream is continuously exposed to the flaming for a particular period of time. In particular, during a period of time of 1 minute the seed stream is continuously exposed to flaming. Alternatively, during a period of time of 3 minutes the seed stream is continuously exposed to flaming.

In this particular arrangement, the total weight of the seeds in the seed stream is 20 grams, the flame is a pencil shaped flame, the rotary speed of the lower base is 360 rpm, and the flaming distance is 5 cm.

In an alternative arrangement, the seed stream is discontinuously exposed to the flaming for a particular period of time.

In a particular arrangement, during a period of time greater than 1 minute (for example 3-6 minutes) the seed stream is continuously exposed to flaming for a set period (for example 1 minute) separated by a period of no flaming (for example, 15 to 60 seconds).

In a first arrangement, during a period of time of 3.5 minutes, the seed stream is exposed to flaming for three 1 minute long periods of time with 15 second long intervals of time where no flaming occurs between two 1 minute long periods of time.

In a second arrangement, during a period of time of 4 minutes, the seed stream is exposed to flaming for three 1 minute long periods of time with 30 second long intervals of time where no flaming occurs between two 1 minute long periods of time.

In a third arrangement, during a period of time of 5 minutes, the seed stream is exposed to flaming for three 1 minute long periods of time with 60 second long intervals of time where no flaming occurs between two 1 minute long periods of time.

In a fourth arrangement, during a period of time of 10 minutes, the seed stream is exposed to flaming for seventeen 0.35 minute long periods of time with 15 second long intervals of time where no flaming occurs between the 0.35 minute long periods of time In a fifth arrangement, during a period of time of 8 minutes, the seed stream is exposed to flaming for five 1.2 minutes long periods of time with 30 second long intervals of time where no flaming occurs between the 1.2 minute long periods of time.

In a sixth arrangement, during a period of time of 7 minutes, the seed stream is exposed to flaming for three 2 minute long periods of time with 60 second long intervals of time where no flaming occurs between the 2 minute long periods of time.

In the first to sixth arrangements the total weight of the seeds in the seed stream was 20 grams, the flame is a pencil shaped flame, the rotary speed of the lower base is 360 rpm, and the flaming distance is 5 cm.

Alternatively, the rotary speed of the lower base may be 180 rpm and the flaming distance may be 5 cm.

According to a second aspect of the invention there is provided an apparatus for ablating seeds, the apparatus comprises a support surface adapted to receive at least one seed, and at least one heat source, wherein the surface is adapted to transfer motion to the seed for exposing the seed to the heat source while the seed is in motion.

Preferably, the support surface is adapted to receive a plurality of seeds for generating a moving stream of seeds to expose the stream of seeds to the heat source.

Preferably, the heat source is adapted to expose a particular location of the stream of seeds to the heat source.

Preferably, the heat source comprises a torch for generating a flame.

In a particular arrangement, the torch comprises a flame spreader.

Preferably, the apparatus further comprises a fixture adapted to receive the torch.

Preferably, the fixture is adapted to receive the torch for maintaining the torch at a particular location from the surface.

Preferably, the fixture is adapted to orient the torch to a particular location of the support surface.

Preferably, the fixture is adapted to vary the height of the torch with respect to the support surface.

In an alternative arrangement, there are provided a plurality of torches.

Preferably, at least one of the torches comprises a flame spreader.

Preferably, there are provided a fixture for supporting each torch within the drum.

Preferably, the fixture is adapted to orient the torch to a particular location of the support surface.

Preferably, the fixture is adapted to vary the height of the torch with respect to the support surface.

Preferably, the apparatus comprises a beam extending from one side of the drum to another side of the drum.

Preferably, the beam is adapted to receive each fixture.

Preferably, the torch is adapted to generate a flame that comprises a pre-combustion zone, a main reaction zone and a post-combustion zone.

Preferably, the flame comprises a propane flame.

Preferably, the flame is a pencil shaped flame of about 38.1 mm to 50.8 mm long.

In another arrangement, the flame is a large volume flame.

In a further arrangement the torch is adapted to produce a cyclone flame

Preferably, the apparatus further comprises a drum having a side wall, a first open end and a second open end.

Preferably, the apparatus comprises a trolley having an upper surface for receiving the drum and a lower storage area for receiving a control system for operating the apparatus.

Preferably, the side wall of the drum is of cylindrical configuration.

Preferably, the drum has a diameter of 334 mm and a height of 200 mm.

In an alternative arrangement, the drum has a diameter of 883 mm and a height of 600 mm.

Preferably, the second open end is adapted to receive the support surface.

Preferably, the support surface comprises a curved rim located adjacent the side wall of the drum defining a gap.

Preferably, apparatus comprises a fan system located below the drum for delivering an air flow through the gap to impede seeds from falling through the gap during operation of the apparatus.

Preferably the support surface comprises a disc.

Preferably, the disc is adapted to rotate around the longitudinal axis of the drum.

Preferably, the fixture for receiving the torch is adapted to be attached to the first end of the drum to allow the torch to reach into the drum to expose the flame to the particular location of the stream of seeds to the flame at the base of the support surface (for example, rotating disc).

Preferably, the drum further comprises at least one mixing bar for provide agitation to the seeds mixing them together and assisting in achieving an even seed ablation/coating.

Preferably, there are plurality of mixing bars arranged in a spaced apart relationship with respect to each other around the inner surface of the drum.

Preferably, the mixing bars abut the inner surface of the side wall of the drum and extend along the longitudinal axis of the drum.

In a particular arrangement, the mixing bars may be located of particular distances from the side wall.

Preferably, the location of the mixing bars may be varied so as to vary the location at which the seed stream abuts the inner surface of the side wall of the drum.

Preferably, the mixing bars are adapted to be rotated around their longitudinal axis.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 5 is an example of a particular coating recipe applied for use in relation to *Triodia* (*Spinifex*) grass seeds which are indicative of Poaceae seeds and seeds with appendages that confound coating/pelleting;

FIG. 13 shows the code labels for the "Study X" which results are shown in FIG. 12;

FIG. 14 shows the germination comparison for different heating intervals for the "Study X" which results are shown in FIG. 12;

FIG. 15 shows the germination comparison for different total heating durations for the "Study X" which results are shown in FIG. 12;

FIG. 18 shows the code labels for the "Study Y" which results are shown in FIG. 17;

FIG. 19 shows the germination comparison for different rotational speeds for the "Study Y" which results are shown in FIG. 17;

FIG. 20 shows the germination comparison for different flaming distances for the "Study Y" which results are shown in FIG. 17;

FIG. 26 shows a table listing the physical properties of seeds before the flaming process;

FIG. 27 shows a table listing the physical properties of seeds after a 3 minutes flaming process;

FIG. 28 show a table listing the changes observed to seek bulk density of seeds undergone flaming process with the raw data used to calculate shown in FIGS. 26 and 27.

DESCRIPTION OF EMBODIMENT(S)

The FIGS. 1 to 4 show a particular arrangement of an apparatus for seed ablation 10 in accordance with an embodiment of the invention.

As will be described with reference to the method of seed ablation in accordance with an embodiment of the invention, a particular arrangement of the apparatus is adapted to expose a heat source to a plurality of seeds while the seeds are in motion.

Exposing of the heat source to the moving seed allows ablation of the seeds for de-awning and removing of the appendages of the seeds.

Figure 1:
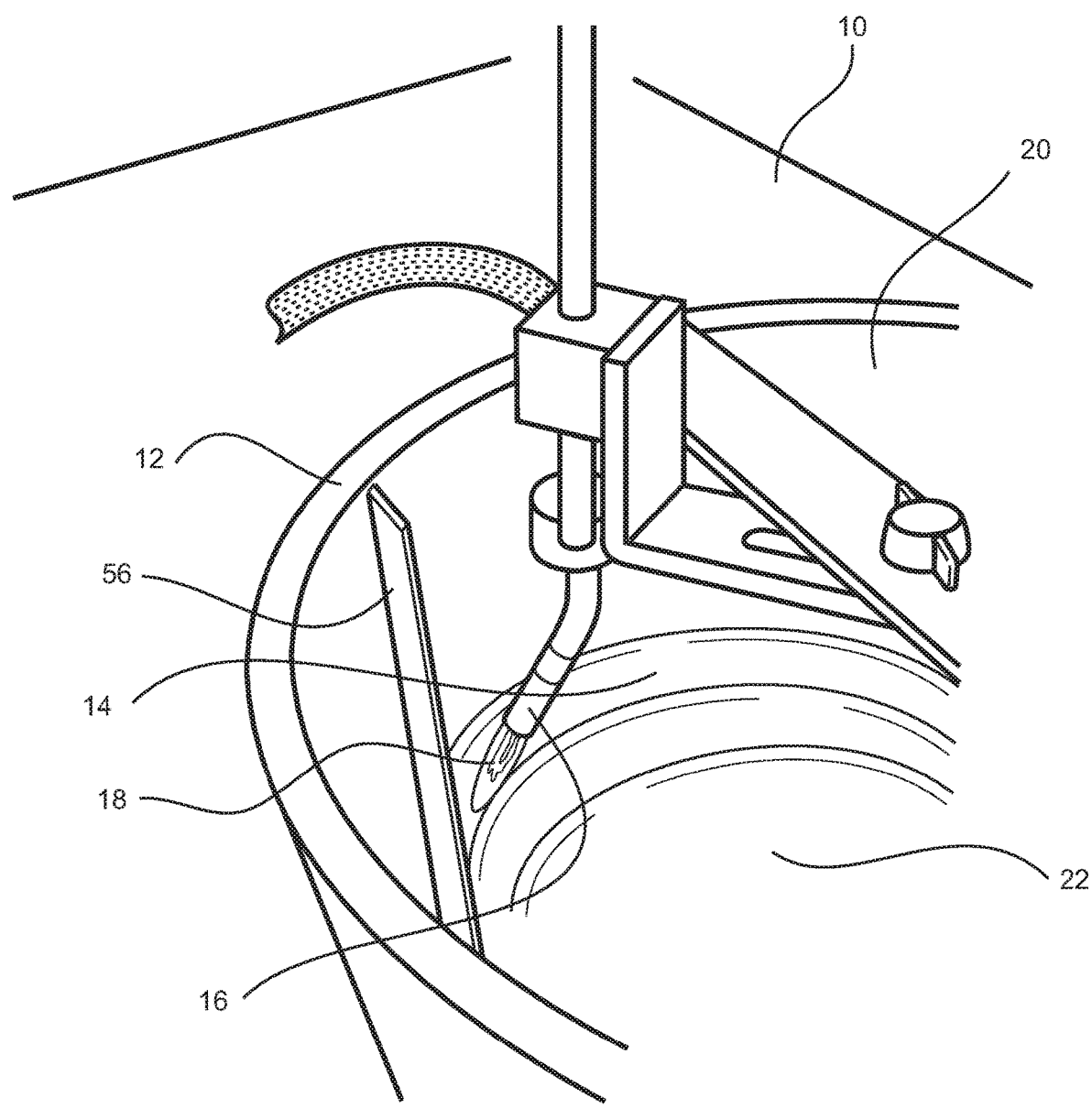
FIG. 1 is a perspective top view of a detail of the seed ablation apparatus in accordance with a first embodiment of the invention.

In the particular arrangement shown in FIG. 1, the seeds are exposed to rotational movement within a drum 12. In this manner a stream 14 of moving seeds is generated. The seed stream 14 abut a particular location of the side wall 20, which can be altered by moving the placement of mixing bars 56, and the speed of rotation of the lower base 22 of the apparatus 10. In an arrangement, the drum 12 has a diameter of 334 mm.

A torch 16, which reaches into the drum 12, provides a flame 18. The torch 16 is oriented in such a manner that the flame 18 is directed to the particular location of the drum 12 allowing the stream of seeds 14 to be exposed to the flame 18. This allows the ablation of the seed awns and appendages over time as seeds enter into contact with the flame 18. This can be best appreciated in FIG. 2.

Preferably, the heat source comprises a flame that comprises a pre-combustion zone, a main reaction zone and a post-combustion zone.

For the stream of seeds 14 to be exposed to the main reaction zone and the post-combustion zone of the flame 18, the torch 16 is separated about 5 cm from the stream of seeds 14. Flame distance to the stream of seeds can be adjusted and is dependent on the seed type and quantities being ablated.

For the stream of seeds 14 to be exposed to the pre-combustion zone, a main reaction zone as well as the post-combustion zone, the torch 16 is separated about 2.5 cm from the stream of seeds 14.

The flame may be a pencil shaped flame. For example, the flame may be about 38.1 mm to 50.8 mm long. In another arrangement, the flame may be a large volume flame. The flame may comprise a propane flame. Other fuel types, heat sources and flame morphologies are also possible.

Figure 2:
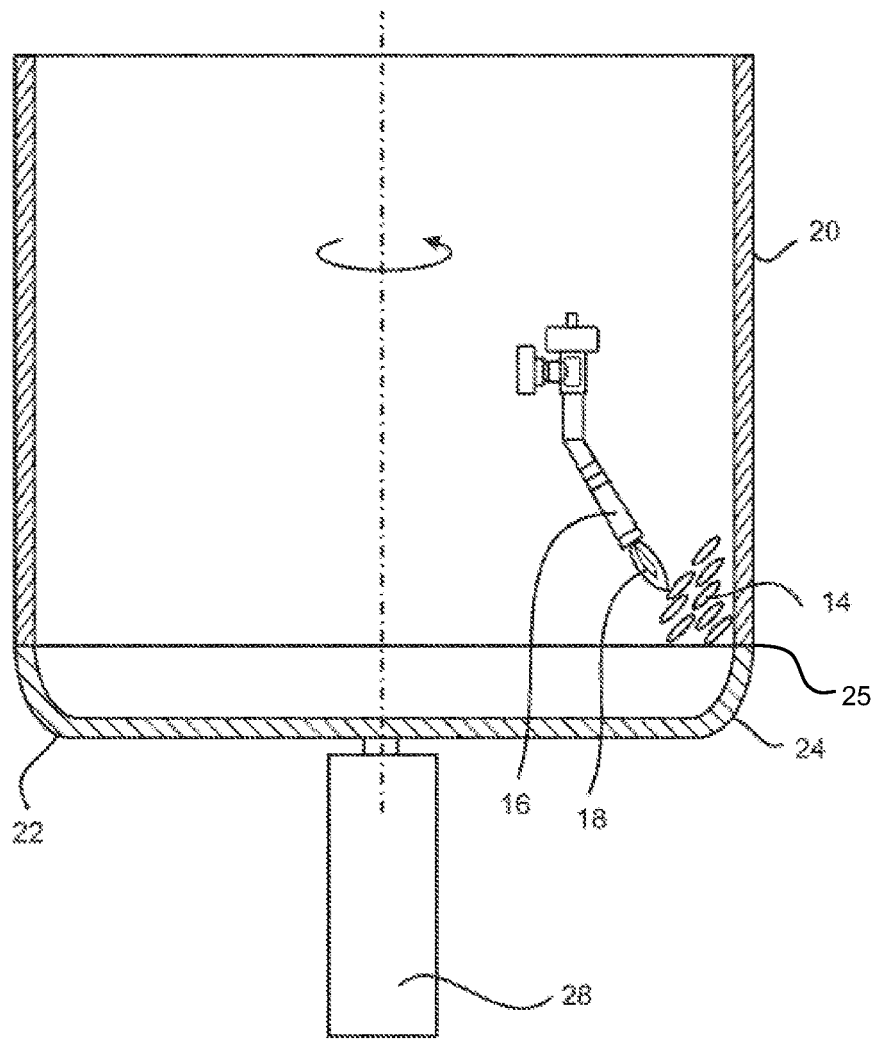
FIG. 2 is a schematic cross-sectional view of the seed ablation apparatus shown in FIG. 1.

FIG. 2 is a schematic cross-sectional view of the seed ablation apparatus 10 in accordance with the present embodiment of the invention.

As shown in FIG. 2, the seed ablation apparatus 10 comprises a side wall 20 and a lower base 22 (also herein referred to as support surface) defining the drum 12. In the particular arrangement shown in FIG. 2, the side wall 20 is configured as a cylindrical wall having open upper and lower ends (also herein referred to as first and second ends). The lower end is adapted to receive the lower base 22. The lower base 22 comprises a rim 24 surrounding the periphery of the lower base 22. The rim 24 is located adjacent to the inner surfaces of the side wall 20 defining a gap 25 between the rim 24 and the side wall 20. For this, the rim 24 is curved upwardly.

The fact that a gap 25 is defined between the rim 24 and the side wall 20 is particularly advantageous. This is because it permits air to be blown from beneath the lower base 22 through the gap 25 impeding seeds exiting the drum 12 through the lower end of the drum 12. For this a fan system is provided below the drum to provide the air to be blown through the gap 25. The fan system may comprise ducted fan.

The lower base 22 is adapted to rotate around the longitudinal axis of the drum 12. For this, the lower base 22 may be operatively connected to a motor 28 to provide rotary motion to the lower base 22 as is shown in FIG. 2. Other arrangements for providing rotary movement to the lower base 22 may be used.

The fact that the lower base 22 is adapted to rotate allows for the generation of the flow of seeds as well as to place the flow of seeds at the particular location depicted in FIG. 2. The support plate 22, whose outer edge is curved upwards, rotates causing the seeds to be projected up the side wall as the centripetal acceleration overcomes the friction force between the seeds and the support plate upper surface. In this manner, the stream 14 of moving seeds is generated at the junction between the curved rim 24 of the lower base 22 and the lower section of the side wall 20 of the drum 12.

The drum 12 includes mixing bars 56 that provide agitation to the seeds mixing them together and assisting in achieving an even seed ablation/coating. In the particular arrangement there is a pair of mixing bars 56 located 180° apart with respect to each other. The mixing bars 56 abut the inner surface of the drum 12 and extend along the longitudinal axis of the drum 12. Other arrangements for mixing bars are possible.

As was mentioned earlier, to remove the bulky nature of seeds through ablation of the awns and the appendages a heat source is located adjacent the seed stream 14. In the particular arrangement of the figures, the heat source comprises a torch 16 that produces a flame 18. The torch 16 reaches into the drum 12 and is oriented in such a manner that the flame 18 is directed to the particularly region of the drum 12 allowing the flame 18 to engage with the stream 14 of moving seeds.

Figure 3:
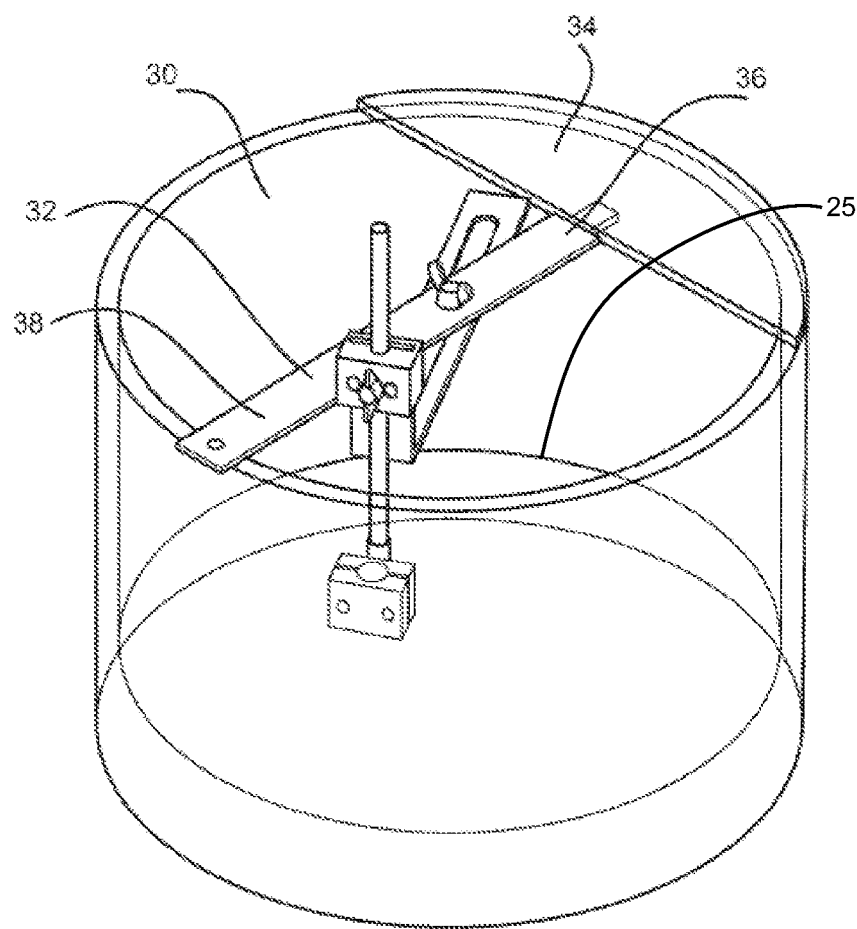
FIG. 3 is a schematic isometric view of the seed ablation apparatus shown in FIG. 1 with the torch removed.

FIG. 3 shows a particular arrangement of the drum 12 adapted to allow the torch 16 to reach into the drum 12 for orienting the flame 18 to the seed stream 14. As shown in FIG. 3, the upper end 30 of the drum 12 is adapted to receive a torch fixture 32. The torch fixture 32 comprises two tabs 36 and 38 for fastening of the torch fixture 32 to the drum 12. For fastening of the fixture 32 to the drum 12, there is provided a plate section 34 for receiving the tab 36 of the fixture. The plate section 34 covers partially the upper end of the drum 12. Other arrangements may be provided for attaching the torch to the drum 12.

Furthermore, the torch fixture 32 is adapted to adjust the distance between the lower base 22 and the torch 16. The torch fixture 32 is also adapted to adjust the distance between the inner surface of the side wall 20 and the torch 16. This allows for orienting the flame 18 to the particular location for ablation of the seeds. This can be best seen in FIG. 4.

Figure 4:
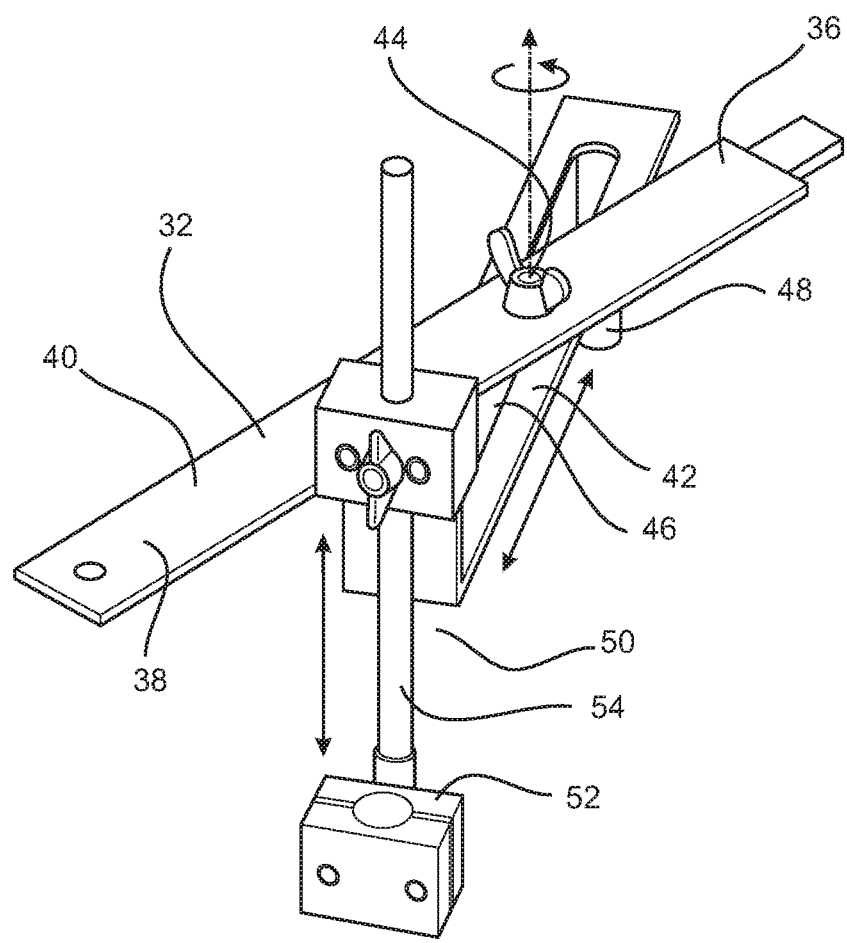
FIG. 4 is a schematic perspective view of the torch fixture (used to clamp the torch which is not shown) of the seed ablation apparatus shown in FIG. 1.

FIG. 4 shows an enlarged view of the torch fixture 32. As shown in FIG. 4, the torch fixture 32 comprises a first plate 40 and a second plate 42.

The first plate 40 is adapted to be fastened to the upper end 30 of the drum 12 as was described above.

The second plate 42 is adapted for attachment to the first plate 40; in particular, the second plate 42 is attached to the first plate 40 to allow a rotational and linear movement of the second plate 42 with respect to the first plate 40.

The rotational movement is accomplished by fastening the second plate 42 via a pivot joint 44. The linear movement is accomplished via a slit 46 that extent longitudinally along the second plate 42.

The torch fixture 32 may include a handle 48 to facilitate pivotal movement of the first and second plate 40 and 42 with respect to each other.

The fact that the first and second plate 40 and 42 are adapted to move with respect to each other allows positioning the torch 16 at a particular distance and angle from the side wall 20 of the drum 12.

Further, the torch fixture 32 is also adapted to locate the torch 16 at a particular distance and angle with respect to the lower base 22 of the drum 12. For this, the torch fixture 32 comprises support means 50. The support means 50 comprises a base 52 adapted to receive the torch 16 and a rod 54. The rod 54 is slideably attached to the second plate 42 to adjust the distance between the torch 16 and the lower base 22.

The above described fixture 32 is particular useful because it allows positioning the torch 16 at specific locations within the drum 12 to allow the seed stream 14 to be exposed to the flame 18. The distance between the seed stream 14 and the flame 18 of the torch 16 may be varied depending, for example, on the particular seed type or quantity of seeds that are being ablated. The distance between the seed stream 14 and the flame 18 is also referred to herein as the "flaming distance".

Moreover, there are other parameters that may be varied to change the ablation conditions. These parameters may be flame intensity (the flame intensity is varied by varying the shape of the flame 18; for example, the flame 18 may be a pencil shaped flame or a large volume flame), rotational speed of the lower base 22, total time of continuous flame exposure to the seed stream 14 as well as the time of flaming intervals during discontinuous flame exposure.

FIGS. 6 to 9 show an apparatus according to a second embodiment of the invention. The apparatus according to the second embodiment is similar to the apparatus according to the first embodiment and similar reference numerals are used to identify similar parts.

Figure 6:
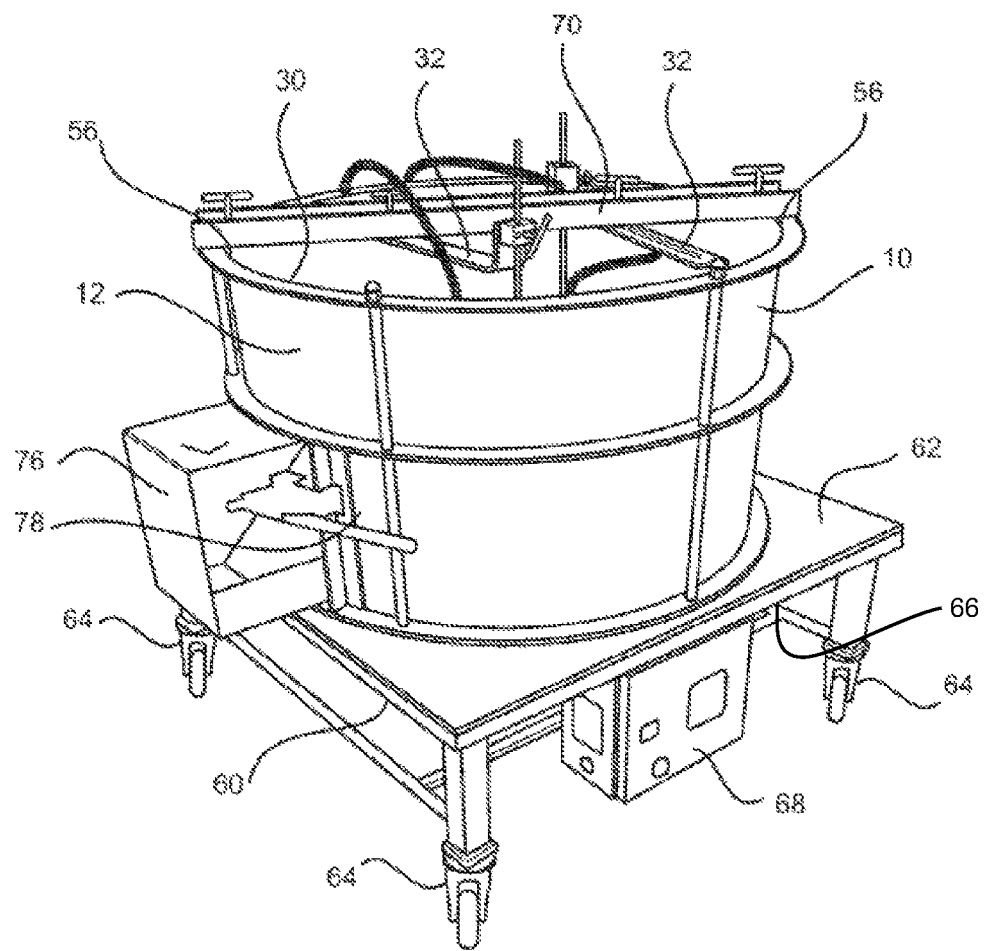
FIG. 6 is a perspective view of a seed ablation apparatus in accordance with a second embodiment of the invention.

FIG. 6 shows an apparatus 10 for seed ablation in accordance with a second embodiment of the invention.

As shown in FIG. 6, the apparatus 10 for seed ablation comprises a drum 12 for exposing the seeds to rotational movement and to flames for ablation of the seeds. As will be described below, the seed ablation apparatus 10 in accordance with the second embodiment of the invention comprises a plurality of torches 16 for exposing the rotating seeds to flames at more than one location of the stream 14 of rotating seeds—see FIGS. 7 and 8.

The seed ablation apparatus 10 comprises a trolley 60 having an upper platform 62 providing a surface for receiving the drum 12. The trolley 60 also comprises wheels 64 permitting transportation of the seed ablation apparatus 10.

Further, the trolley comprises a storage area 66 for receiving the control system 68. The control system 68 is operatively connected to the drum 12 and the torches 16 for conducting the seed ablation process. The torches 16 comprise valve means and regulators operatively connected to a fuel supply (e.g. gas cylinders) through hoses 17—see FIG. 1.

Furthermore, it was mentioned before during operation of the apparatus 10 air may be blown from beneath the lower base 22 of the drum 12 through a gap 25 defined between the rim 24 of the lower base 22 and the side wall 20 of the drum; this impedes seed material from falling through the gap 25. The air is generated by a fan system located under the drum 12. The fan system is operatively connected to the control system 68 for operation thereof.

Figure 7:
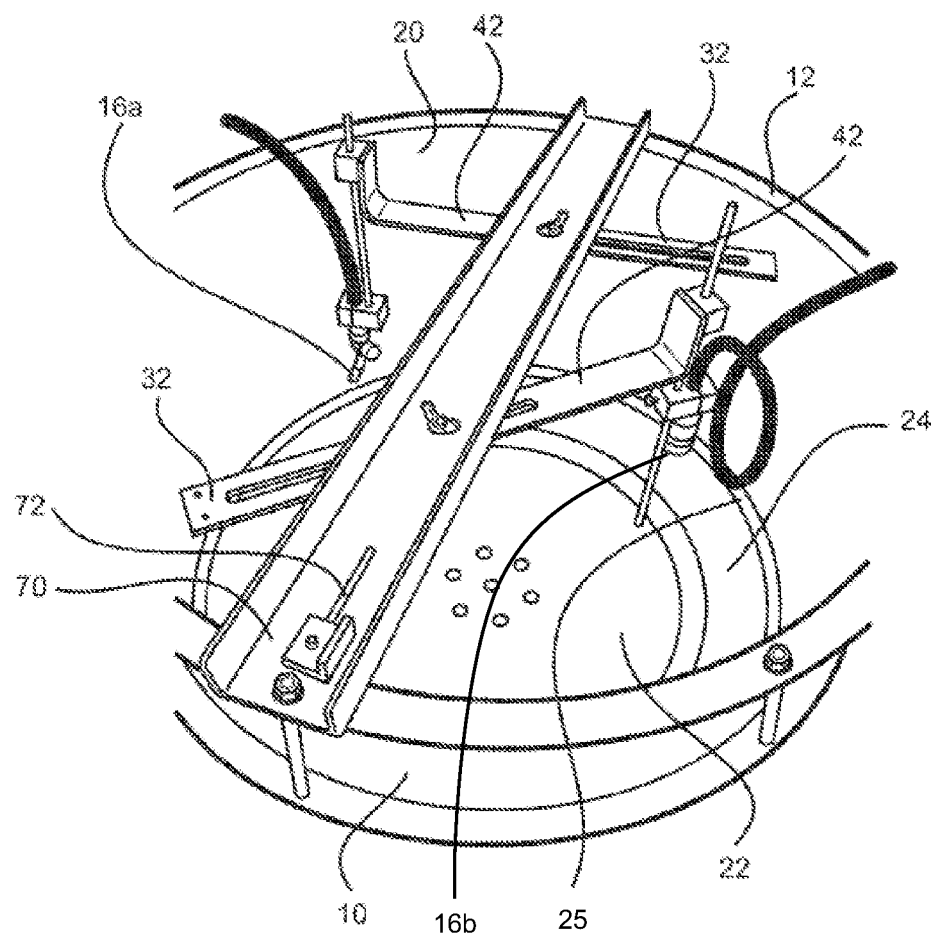
FIG. 7 is a perspective top view of a detail of the seed ablation apparatus shown in FIG. 6.

Referring now to FIG. 7. FIG. 7 is a top view of the drum 12 of the seed ablation apparatus 10.

As shown in FIG. 7, the seed ablation apparatus 10 comprises a side wall 20 and a lower base 22 (also herein referred to as support surface) defining the drum 12. In the particular arrangement shown in FIG. 7, the side wall 20 is configured as a cylindrical wall having open upper and lower ends (also herein referred to as first and second ends). The lower end is adapted to receive the lower base 22. The lower base 22 comprises a rim 24 surrounding the periphery of the lower base 22. The rim 24 is spaced apart from the inner surfaces of the side wall 20 defining the gap 25. For this, the rim 24 is curved upwardly. This arrangement impedes from seeds exiting the drum 12 through the lower end of the drum 12.

Figure 8:
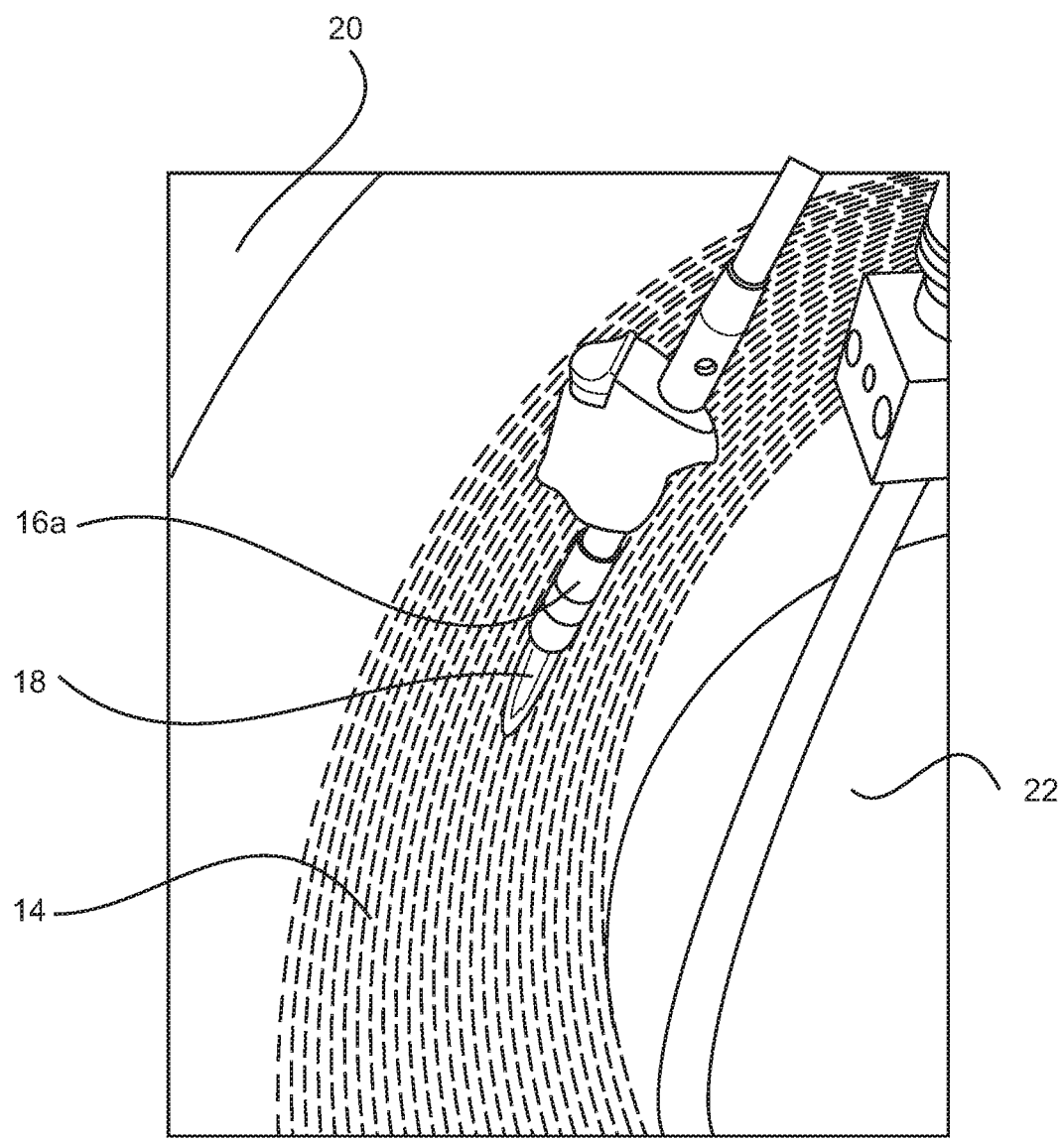
FIG. 8 is a perspective top view of a detail of the interior of the seed ablation apparatus shown in FIG. 6 during operation thereof.

As was described with reference to the first embodiment of the invention, in accordance to the second embodiment of the invention the lower base 22 is also adapted to rotate for generating the flow of seeds as well as to place the flow of seeds at the junction between the curved rim 24 of the lower base 22 and the lower section of the side wall 20 of the drum 12 as is depicted in FIG. 8.

As was mentioned before, the seed ablation apparatus 10 in accordance with the second embodiment of the invention comprises a plurality of torches 16 for exposing the rotating seeds to flames at more than one location of the stream 14 of rotating seeds.

FIG. 7 shows a particular arrangement of the drum 12 adapted to allow pair of torches 16a and 16b to reach into the drum 12 for orienting the flame 18 to the seed stream 14. As shown in FIG. 7, the upper end 30 of the drum 12 is adapted to receive a support beam 70 for fastening a pair of torch fixtures 32, each one for supporting a torch 16.

Each of the fixtures 32 comprises the second plate 42 (mentioned above when describing the torch fixture 32 of the seed ablation apparatus in accordance with first embodiment of the invention). The second plate 42 is attached to the beam 70 to allow a rotational and linear movement of the second plate 42 with respect to the beam as described with reference to the torch fixture 32 of the seed ablation apparatus 10 in accordance with first embodiment of the invention.

By rotating and longitudinally moving the torch fixtures 32, the torches 16a and 16b may be located at locations around the inner periphery of the drum 12 and adjacent to the inner wall of the drum 12. As shown in FIG. 7, the fixtures 32 have been arranged in such a manner that the rotating seed flow are exposed to the flames 18 generated by the torches 16a and 16b at two different locations.

Figure 9:
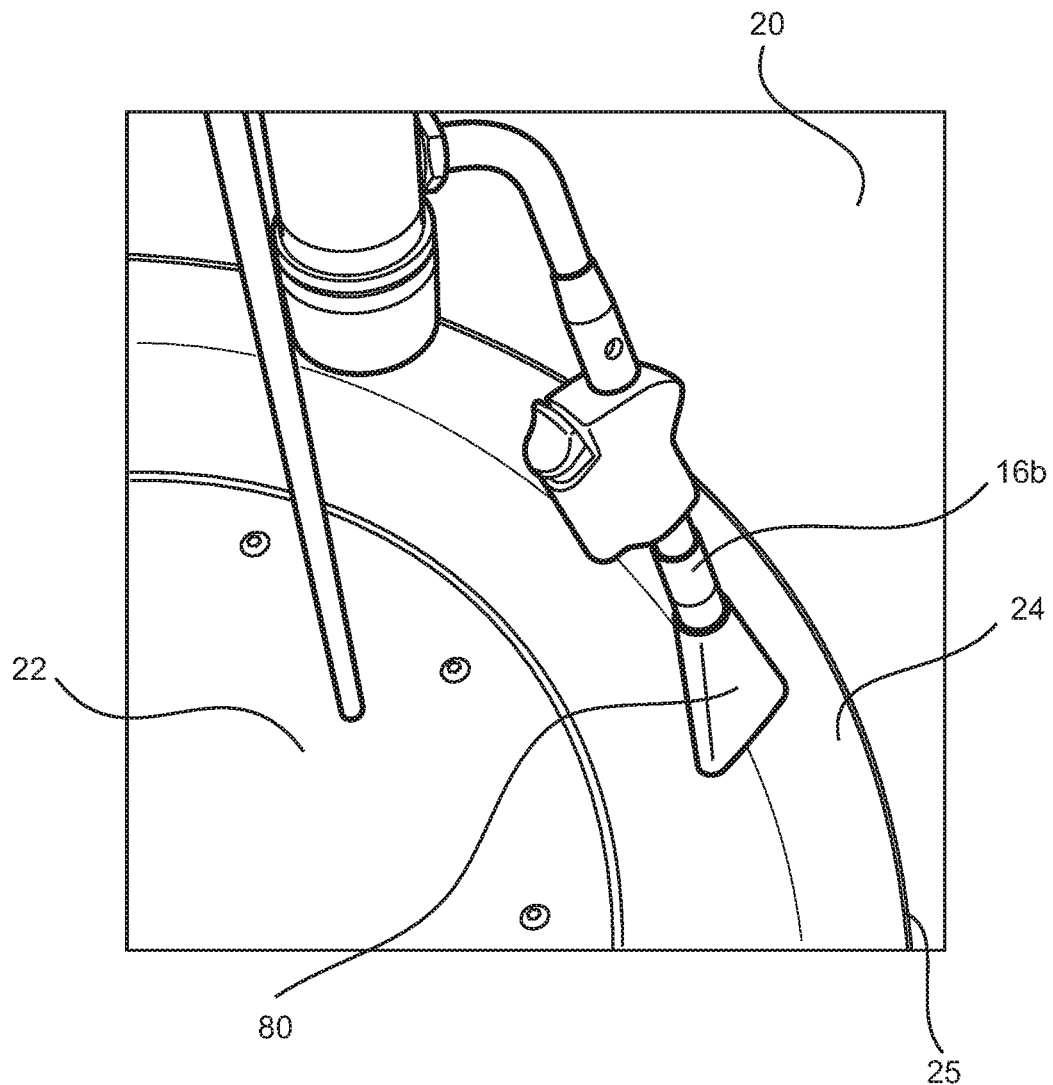
FIG. 9 is a perspective top view of a detail of the interior of the seed ablation apparatus shown in FIG. 6 showing one of the flames.

FIGS. 8 and 9 show the interior of the drum depicting the torches 16a and 16b.

FIG. 8 shows the seed ablation apparatus 10 in operation with torch 16a directing the flame 18 towards the stream 14 of seeds.

As shown in FIG. 9, the torch 16b comprises a flame spreader 80. In this particular arrangement, only one of the torches 16 includes a flame spreader 80; in alternative arrangements, both torches 16a and 16b may include flame spreaders 80.

Furthermore, as mentioned with reference to the seed ablation apparatus 10 in accordance with the first embodiment of the invention the stream 14 of rotating seeds may be altered using mixing bars 56 located adjacent the inner walls of the drum 12.

In accordance with the second embodiment of the invention, the seed ablation apparatus 10 comprises a plurality of mixing bars 56. Each mixing bar 56 is located adjacent the inner walls of the drum 12 and underneath one of the ends the beam 70 that is attached to the wall 20 of the drum 12. In this manner, the mixing bars 56 are opposite to each other.

In the particular arrangement shown in the figures, there are two mixing bars 56. The mixing bars 56 are slideably attached to the beam 70 to permit varying the distance between each mixing bar 56 and the inner wall of the drum 12. The mixing bars 56 may also be adapted to be rotated around their longitudinal axis to change the orientation of the mixing bars with respect to the drum wall 20.

As shown in the particular arrangement of FIG. 7, the beam 70 comprises, at each end, a slot 72 to which the upper end of a mixing bar 56 is slideably attached. This permits varying the distance between the mixing bars 56 and the inner surface of the side wall 20.

The seed ablation apparatus comprises means for evacuating the processed seed material. For this, the drum 12 comprises a chute 76 (as per standard drum coaters) and a handle 78. The handle 78 controls a toggle clamp attached to a hinged door. During operation, with the base rotating, a container may be placed under the chute for the processed seed material to fall into the container by opening the door using the handle 78.

Furthermore, in accordance with a particular arrangement of the second embodiment of the invention, the seed ablation apparatus 10 comprises torches adapted to provide cyclone flames.

In a particular arrangement, the width of the flame is about 15 mm; in another arrangement the width of the flame is about 35 mm.

Moreover, in a particular arrangement of the seed ablation apparatus 10 in accordance with the second embodiment of the invention, the drum 12 comprises a diameter of 883 mm and a height of 600 mm. The drum 12 is adapted to rotate at rotational speeds of 86 rpm to 100 rpm.

A trial was conducted using this particular arrangement of seed ablation apparatus 10 using 3000 ml (286 grams) of floret material. The trial consisted in rotating the drum 12, containing the seed material, at a speed of 96 rpm. The torches 16 were positioned so that the tip of each flame contacted the stream 14 of seeds and the seeds were subject at an initial flaming time of 20 minutes. After trial the volume of the seed material decreased 33% to 2000 ml and decreased in weight by 15%.

The present embodiment of the invention also relates to a method for conditioning seeds; in particular, the method comprises applying a heat source to a stream of seeds, while the seeds are in motion so as to flash flame seeds.

In a particular arrangement of the method, the method includes the steps of: generating a moving stream of seeds 14 and applying a flame 18 to the moving seed stream for ablation of awnings and appendages from the seeds.

The method further comprises the steps of varying the time period that the seed stream will be exposed to the flaming such that the particular location of the seed stream 14 may be periodically exposed for a particular period of time to the heat source. Variations in the time period and exposure to flaming are dependent on the seed type and quantities being ablated.

In an arrangement, the seed stream is continuously exposed to the flaming for a particular period of time. In particular, during a period of time of 1 minute the seed stream is continuously exposed to flaming. Alternatively, during a period of time of 3 minutes the seed stream is continuously exposed to flaming.

In this particular arrangement the total weight of the seeds in the seed stream 14 is 20 grams, the flame 18 is a pencil shaped flame, the rotary speed of the lower base is 360 rpm, and the flaming distance is 5 cm.

In this arrangement, the particular location of the stream of seeds 14 is exposed 0.00318 seconds to the flame 18.

In an alternative arrangement, the seed stream discontinuously exposed to the flaming for a particular period of time.

In a first arrangement, during a period of time of 3.5 minutes, the seed stream is exposed to flaming for three 1 minute long periods of time with 15 second long intervals of time where no flaming occurs between two 1 minute long periods of time.

In a second arrangement, during a period of time of 4 minutes, the seed stream is exposed to flaming for three 1 minute long periods of time with 30 second long intervals of time where no flaming occurs between two 1 minute long periods of time.

In a third arrangement, during a period of time of 5 minutes, the seed stream is exposed to flaming for three 1 minute long periods of time with 60 second long intervals of time where no flaming occurs between two 1 minute long periods of time.

In a fourth arrangement, during a period of time of 10 minutes, the seed stream is exposed to flaming for seventeen 0.35 minute long periods of time with 15 second long intervals of time where no flaming occurs between the 0.35 minute long periods of time In a fifth arrangement, during a period of time of 8 minutes, the seed stream is exposed to flaming for five 1.2 minutes long periods of time with 30 second long intervals of time where no flaming occurs between the 1.2 minute long periods of time.

In a sixth arrangement, during a period of time of 7 minutes, the seed stream is exposed to flaming for three 2 minute long periods of time with 60 second long intervals of time where no flaming occurs between the 2 minute long periods of time.

In the first to sixth arrangements the total weight of the seeds in the seed stream 14 was 20 grams, the flame is a pencil shaped flame, the rotary speed of the lower base is 360 rpm, and the flaming distance is 5 cm.

Alternatively, the rotary speed of the lower base may be 180 rpm, and the flaming distance may be 5 cm. In this arrangement, the particular location of the stream of seeds is exposed 0.00953 seconds to the flame.

The method may further comprise the steps of coating the ablated seeds.

In an arrangement, the seed coating method comprises a two-step process of progressive seed bulking (Table 1 of FIG. 5). This particular coating process (though the ablated seed could be adapted to other coating and pelleting processes) includes applying (1) a polymer binder first in both of the two steps of the two-step process and (2) a filler material. More specifically, the first step (Step 1) is known as the base coat and involves typical seed coating methods whereby after complete application of the binder, the filler material is added, allowing the filler to adhere to the seeds. The second step (Step 2) involves, while continually adding the binder amount at a known rate, the addition of filler material in short bursts until both the binder and filler are completely applied. Coated seeds are then dried to complete the seed bulking process. Table 1 of FIG. 5 shows an example of a particular coating recipe applied for use in relation to Triodia (Spinifex) grass seeds.

The following paragraphs disclose the Results and Discussions of particular methods of seed ablation.

Results and Discussions

Visual Inspection

Figure 10:
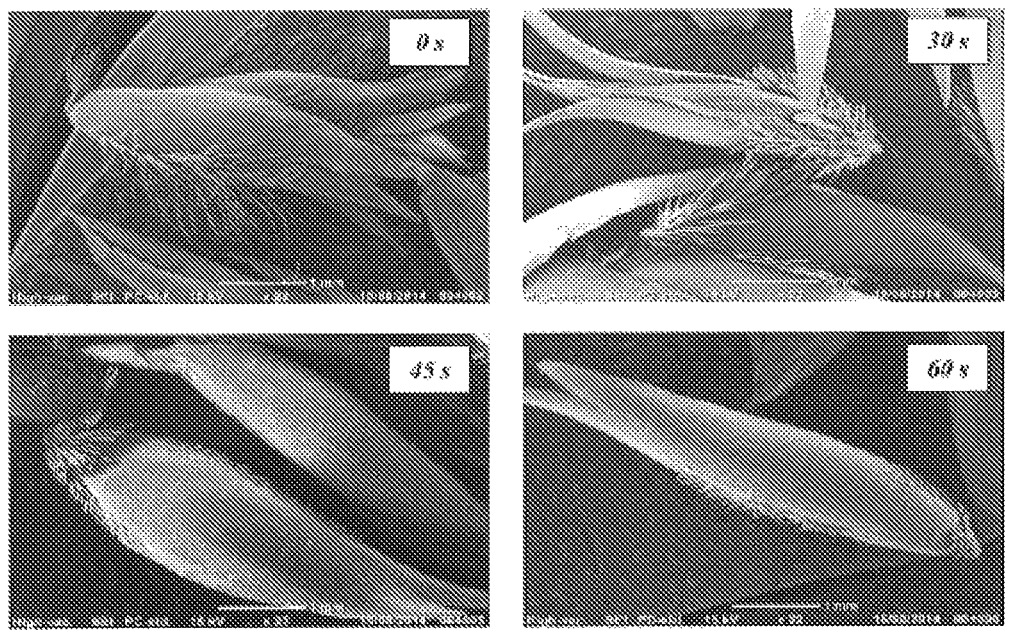
FIG. 10 are photographic depictions of the progressive ablation process over 60 seconds for samples taken periodically from a flamed batch with a total seed weight of 10 grams.
Figure 11:
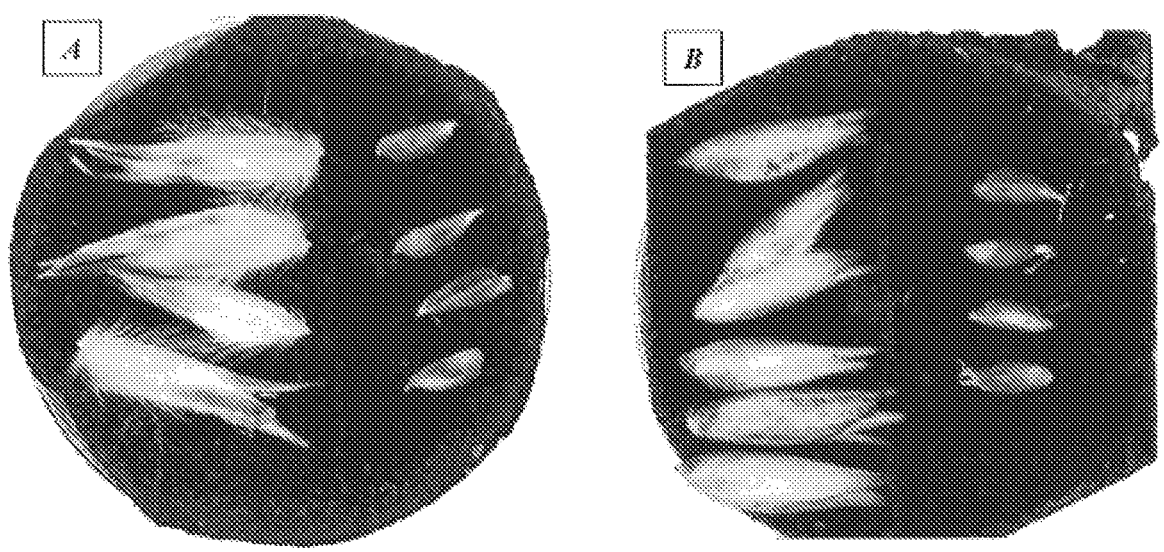
FIG. 11 are photographic depictions of treated (Batch B) and untreated (Batch A) *Triodia* (*Spinifex*) Seeds showing Florets on the left of the Batches B and A and showing Caryopsis on the right of the Batches B and A.

The progressive ablation process for samples taken periodically from a flamed batch with a total seed weight of 10 grams is shown in FIG. 10. Seeds for the different heating durations were scanned, with SEM images taken of that represented the majority.
1) Control (0 seconds): Untreated Seed under SEM, shows significant presence of appendages (surface hairs and awns), making the seed shape very irregular
2) Treated (30 seconds): After 30 seconds, significant reductions in hair length when compared to control occurs. However, awn length still relatively unchanged
3) Treated (45 seconds): After 45 seconds, significant overall and uniform reduction in both hair and awn length is shown
4) Treated (60 seconds): After 60 seconds, a very uniform and clean finish in relation to both awn and hair length is achieved Visual inspection under the Leica microscope was conducted and compared for flamed and untreated seeds (FIG. 11). Examination of the specimens revealed the following:
1) Florets (outer husk): Comparing the control (A) and the flamed (B) florets, significant and uniform ablation of surface hairs and awn tips have been achieved using the 'rotary flaming' method. This directly contrasts the findings in the initial flaming trials which showed uneven ablation of appendages and severe charring and blackening of the floret.
2) Caryopsis (internal seed/grain): Even with a relatively long heating duration (3-minutes), there were no differences in visual appearance for the caryopsis of the control (A) and the flamed (B) seeds. Once again this directly contrasts the findings in the initial flaming trials where severe blackening and charring of the caryopsis was present.

From the preceding, it is clear that with the 'rotary flaming' method, significant appendage removal for Triodia (Spinifex) seeds is possible. The treatment resulted in the complete and uniform ablation of hairs, the shortening of the awns and overall, simplification of the seed geometry. The uniformity of the ablation can be accredited to the natural mixing and agitation effect provided by the in built mixing bars of the rotary coater, which ensures even flame exposures for the total heating duration. As seeds collide with the mixing bars, these light impact forces are likely to also remove singed appendages, as they would be brittle due to charring effects.

Figure 12:
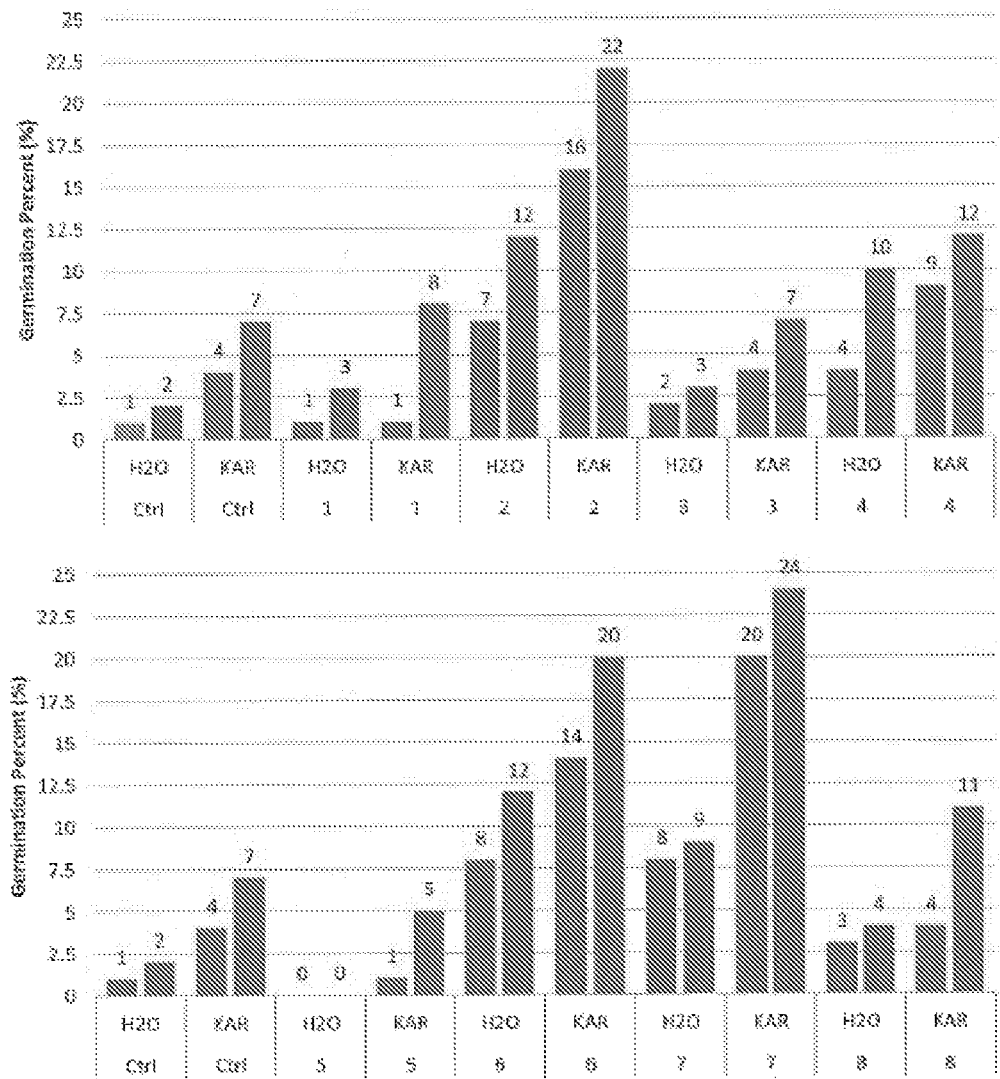
FIG. 12 show the germination results of "Study X" in which the total heat treatment duration and interval is varied as outlined in FIGS. 13 to 16.
Figure 17:
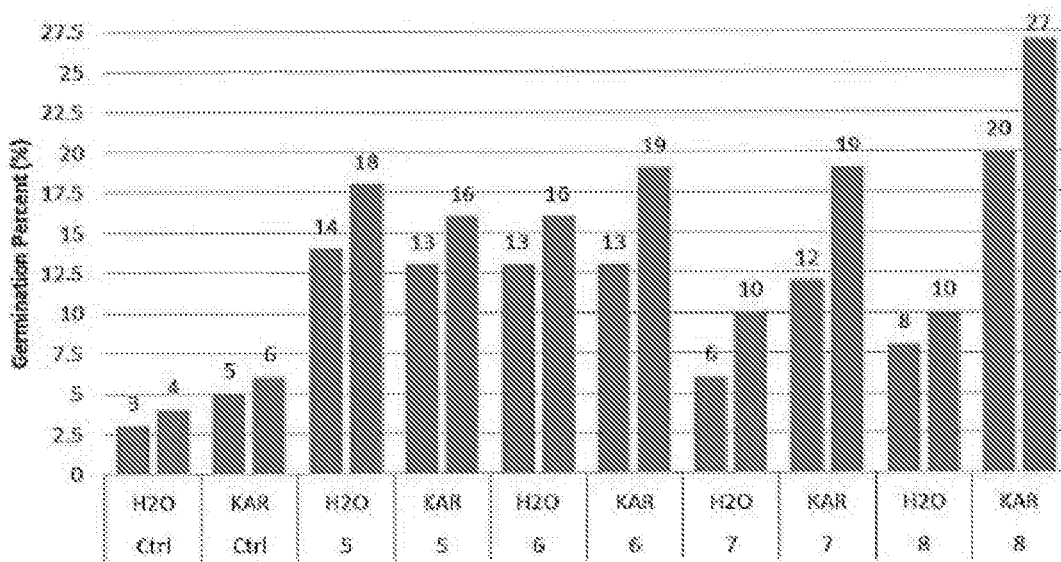
FIG. 17 shows the germination results of "Study Y" in which revolution per minute (RPM), flaming distance, flame profile are varied as outlined in FIGS. 18 to 22.

Another key finding from visual inspection was that, unlike the initial trial, misting of water onto the seeds was not a requirement for the 'rotary flaming' method as the seeds did not instantaneously combust on contact with the flame. This can be accredited to the extremely low flame exposure times for the method. Using the lowest practical rotational speed of 120 RPM, the following measure of flame exposure were calculated:
1) Seeds experience an instantaneous seed flame exposure time per revolution of approx. 0.00953 seconds Germination Testing Germination results for the study are shown in FIG. 12 ("Study X") and FIG. 17 ("Study Y"). To facilitate understanding and explanation of the graphs, refer to the following:
1) On the X-axis you have the different heat treatments, starting with the control "Ctrl" on the left, followed by digits which are code labels for the different tests conducted as displayed in the tables under the respective graphs
2) There are two variations of tests for each heat treatment, "H20"-blue bars and "KAR"-red bars, referring to the different germination media used
3) The Y-axis shows the germination percent, and for each germination media there are two bars representing the germination percent in weeks 1 and 2 respectively.

This is represented as an accumulation of germination since day 0, hence germination percent in week 2 will always be greater than or equal to germination percent in week 1.

As "Study X" focused on evaluating the effects of varying heating intervals and total heating durations on germination potential, germination values were averaged and compared for the different heating intervals and durations as shown in FIG. 14 and FIG. 15; respectively.

For heating intervals, the general trend inferred was that increasing heating interval time decreases average germination potential. However, surprisingly all of the interval times tested up to 60 seconds performed very well when compared to the control, with the 3-minute continuous treatment being the only one that performed poorly against the control.

For heating durations, the general trend shown was that increasing heating duration increases average germination potential. Once again, this was a surprising result given that detrimental effects on viability were expected, as the heating durations that performed very well (3 and 6 minutes) were very long given the amount of seed flamed (20 grams).

Figure 16:
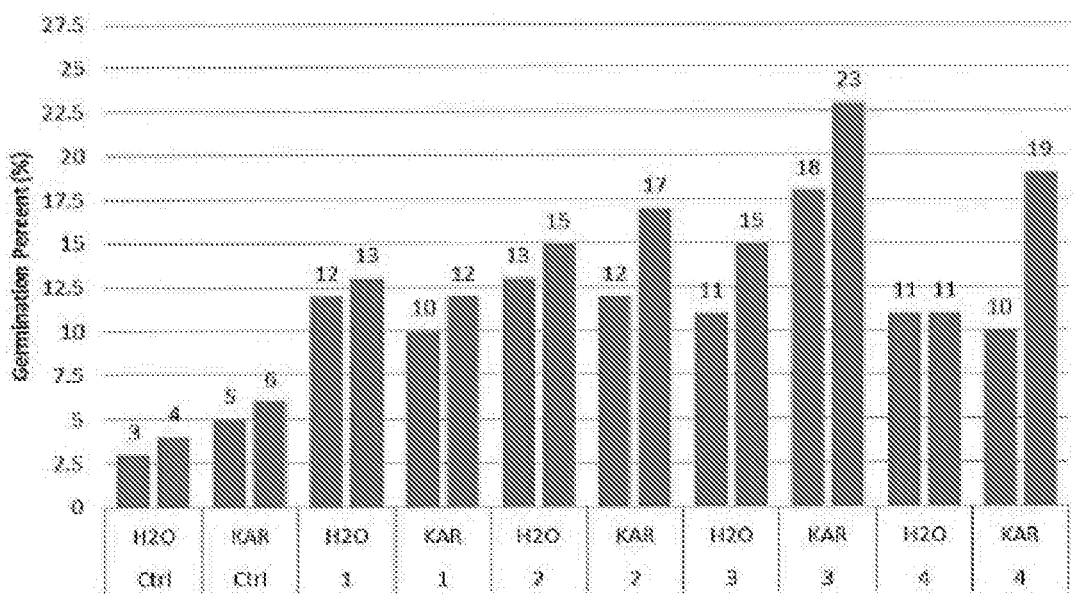
FIG. 16 shows the overall germination comparison for flamed versus untreated seeds for the "Study X" which results are shown in FIG. 12.

The overall germination comparison for flamed and untreated seeds is shown in FIG. 16. Results from "Study X" indicate that flamed seeds performed 3.31 times better than the control after two weeks of germination when using only water as the germination media and 1.95 times better than the control when Kamikinolide solution is used.

Figures 21, 22, 23:
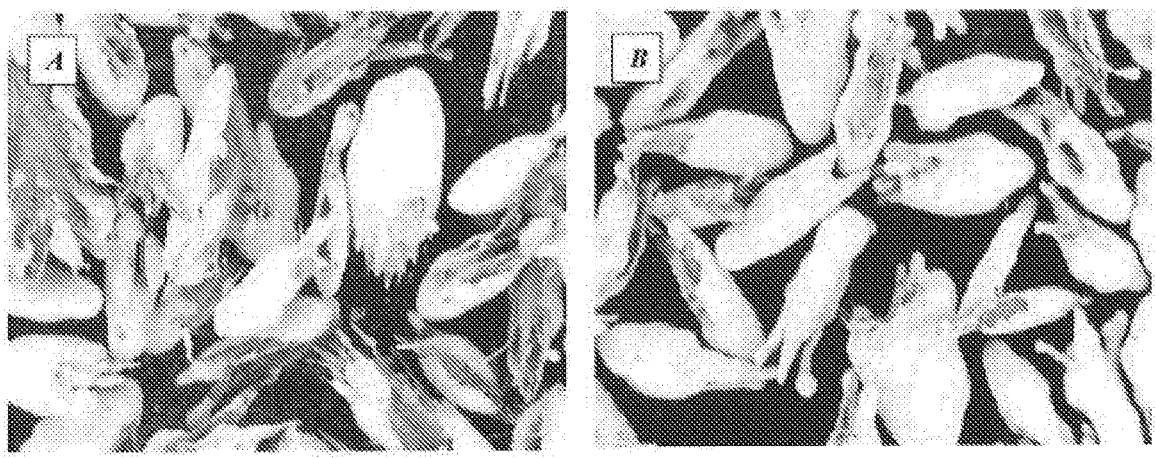
FIG. 21 show the germination comparison for different flaming intensity for the "Study Y" which results are shown in FIG. 17.
FIG. 22 shows the germination comparison for flamed seeds versus untreated seeds for the "Study Y" which results are shown in FIG. 17.
FIG. 23 are photographic depictions of flamed (Batch B) and untreated (Batch A) of coated *Triodia* (*Spinifex*) Seeds under Leica microscope.

Comparisons for the different parameters tested for "Study Y" are shown in FIG. 19, FIG. 20, and FIG. 21.

With the different rotary speeds, on average the results are inconclusive, with 180 RPM outperforming 360 RPM when water is germination media whilst being outperformed when the germination media is a Karrikinolide solution. However, flamed seeds are still consistently outperforming the control untreated seeds in terms of germination potential.

Results from comparing germination results from varying flaming distance indicate no major differences, with identical results when water is the germination media with a slight edge given to the further flaming distance (5 cm) when the germination media is the Karrikinolide solution.

For flame intensity, results are inconclusive (similar to conclusion reached for rotary speed) as the flame profiles outperformed each other in different germination media.

Figure 24:
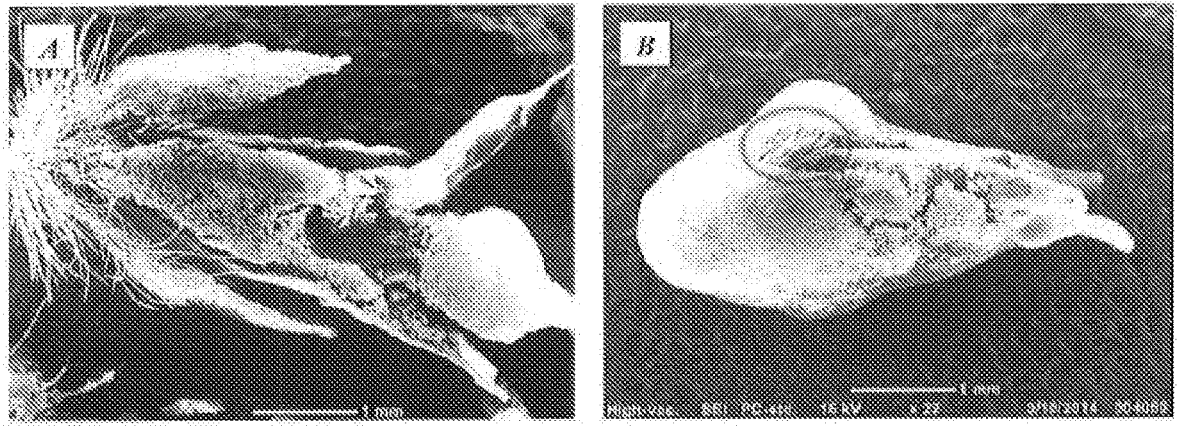
FIG. 24 are photographic depictions of flamed (Batch B) and untreated (Batch A) of coated *Triodia* (*Spinifex*) Seeds under SEM.
Figure 25:
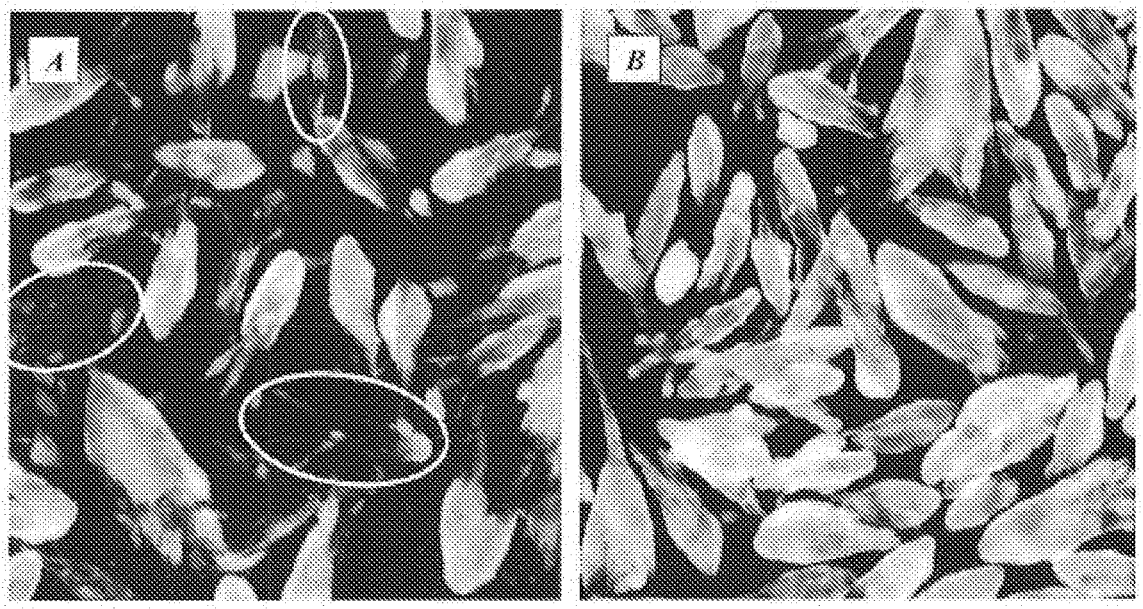
FIG. 25 are photographic depictions of flamed (Batch B) and untreated (Batch A) of coated *Triodia* (*Spinifex*) Seeds under X-Ray.

Overall, similar to "Study X", the very surprising yet remarkably consistent result was that overall seed germination potential is enhanced significantly when the seeds are flamed. Taking an average over the two studies, flamed seeds performed 3.34 times better than the control after two weeks of germination when using only water as the germination media and 2.46 times better than the control when Karrikinolide solution is used. Through consultation with seed scientists at Kings Park and Botanic Gardens, the following deductions on the results were made (Erickson, 2014b, Merrit, 2014):

1) Significant increases in germination due to flaming is likely due to the flaming reducing some form of physiological dormancy present in the *Triodia florets*—most likely weakening the floret structure to reduce the mechanical resistance of the floret, allowing a higher proportion of seeds to germination
2) Potential that the direct flaming treatment provides a 'smoke' treatment which further stimulates germination—similar to the effect of using Karrikinolide Coating Results Coating results for flamed and untreated seeds are compared in FIG. 23 (Leica), FIG. 24 (SEM), and FIG. 25 (X-ray).

Collectively, the figures show that seed coating adhesion is on a much higher level for flamed seeds. In reference to FIG. 24, we can see that the coated flamed seed (B) when compared to the coated untreated seed (A) is considerably more uniformly shaped and coated. Conveniently, (B) also shows that the main flaw in the coating is located at where the remainder of the hairs are still present. This confirms our initial hypothesis, being that the appendages for the *Triodia* (*Spinifex*) seeds hinder coating attempts by introducing stress concentrations to the coat. Therefore, through effective and uniform removal of the appendages with application of the rotary flaming technique, we have alleviated seed coating repellency and have essentially made seed coating a viable technique for *Triodia* (*Spinifex*) seeds.

Changes in Physical Properties

Resulting changes to seed bulk density with flaming is summarised in FIG. 28, with the raw data used to calculate the changes shown in FIG. 26 and FIG. 27. Major findings indicate that the flaming method produces an average increase in bulk density by 43.4%, through reducing seed volume and weight on average by 35.9% and 8.1% respectively.

Processing Rate

Figure 29:
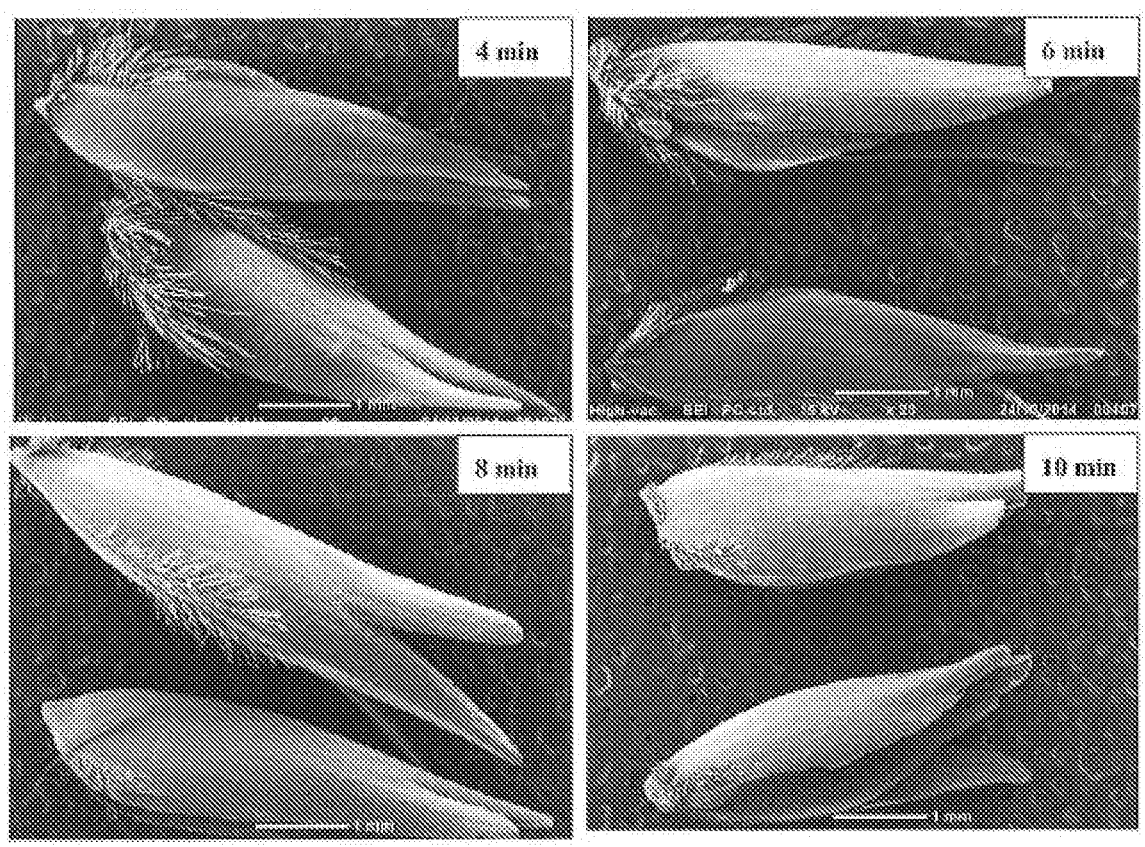
FIG. 29 are photographic depictions of the progressive sampling process over 10 minutes for samples taken periodically at 4 minutes, 6 minutes, 8 minutes and 10 minutes from a flamed seed batch weighing 100 grams.

Periodic samples taken from a 100 g batch of seeds is shown in FIG. 29.

Satisfactory ablation of appendages was found to occur at the 10-minute mark. Therefore seed processing rate was determined to be 100 grams per 12 minutes (including cooling time) or 500 grams per hour with the current set up. Potential processing rates with use of larger equipment is estimated based on scaling processing rate with ratio of heating capacity (BTU/hour). For example, given that the heating capacity (BTU/hour) equals 2,534 for the UL2317 propane torch (test-rig torch), an alternate torch (such as Sievert's 3346 soft flame burner) with a heating capacity (BTU/hour) value of 88,000 (Companion Brands, 2014) would be estimated to have a processing rate that is 88,000/2,534=34.7 times more than the processing rate calculated from the test-rig. Therefore, an estimated processing rate with the Sievert 3348 torch would be 17.4 kg/hour. Although this is relatively low when compared to processing rates reported for brushing machines of 50 to 60 kg/hour (Loch et al., 1996), with the use of large commercial rotary drums, the potential to use multiple burners to flame seeds a at once is a real possibility.

Modifications and variations as would be apparent to a skilled addressee are deemed to be within the scope of the present invention.

Further, it should be appreciated that the scope of the invention is not limited to the scope of the embodiments disclosed. By way of example, the apparatus in accordance with the present embodiment of the invention has been described as incorporating a single torch 16 for generating of the flame 18. In other arrangements, the apparatus may include a plurality of torches 16 that are, for example, arranged in a spaced apart relationship with respect to each other. In alternative arrangements, the flame 18 or flames 18 may include particular morphologies (broad, diffused etc.).

Furthermore, the apparatus in accordance with the present embodiment of the invention has been described as comprising a drum 12 as depicted in the herein attached FIG. 1. In accordance with alternative embodiment, the apparatus for seed ablation may comprise a cylindrical body having upper and lower open ends, wherein the upper end being adapted to receive the unprocessed seeds and the lower end being adapted to discharge the ablated seeds. Also, the cylindrical body may be diagonally oriented and adapted to rotate around its longitudinal axis to allow the formation of a stream of seeds that flow around the inner surface of the cylindrical body and exit an open end of the cylindrical body for collection of the processed seeds. Such an arrangement may, for example, use an Archimedes Screw principle. In this particular embodiment, there may be provided one or more torches 16 adapted to generate flames oriented towards the inner surface of the cylindrical body to enter in contact with the stream of seeds that is traversing the cylindrical body. For example, there may be provided a central mast traversing the cylindrical body and secured to the cylindrical body so that the mast rotates with the cylindrical body, wherein one or more of the torches are arranged in a spaced apart relationship with respect to each onto the mast.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A method for ablating awns, hairs and appendages of seeds located within a drum adapted to expose the seeds to rotational movement for generating within the drum a stream of seeds rotating one or more times about a longitudinal axis of the drum, the method comprising:
   rotating at least a portion of the drum for exposing the seeds to rotational movement generating the stream of seeds rotating within the drum about the longitudinal axis of the drum; and
   exposing at least one particular location of the stream of seeds to at least one flame,
   wherein the stream of seeds rotates about the longitudinal axis of the drum a plurality of times for periodically exposing the particular location of the stream of seeds to the flame.

2. The method according to claim 1 wherein the flame comprises a cyclone flame.

3. The method according to claim 1 wherein the flame comprises a pre-combustion zone, a main reaction zone and a post combustion zone and wherein the particular location of the stream of seeds is exposed simultaneously to the pre-combustion zone, the main reaction zone and the post-combustion zone of the flame.

4. The method according to claim 1 wherein the flame comprises a pre-combustion zone, a main reaction zone and a post combustion zone and wherein the particular location of the stream of seeds is exposed simultaneously to the main reaction zone and the post-combustion zone of the flame.

5. The method according to claim 1, wherein the distance between the stream of seeds and the flame is variable.

6. The method according to claim 5 wherein the distance of the flame with respect to the stream of seeds is such that the contact between the stream of seeds and a combustion zone is maximised.

7. The method according to claim 1 wherein exposure of the particular location of the stream of seeds to the flame occurs for a period of time that has a duration of 0.003 seconds or 0.009 seconds.

8. The method according to claim 1 further comprising coating the seeds after the seeds are exposed to the flame.

9. A The method according to claim 1 wherein the stream of seeds is either continuously or discontinuously exposed to the flame for a particular period of time.

10. The method according to claim 1, wherein the flame is a pencil shaped flame of about 38.1 mm to 50.8 mm long.

11. The method according to claim 1, further comprising a step of inserting into the rotating stream of seeds at least one bar for agitating the seeds of the stream of seeds.

12. The method according to claim 11, further comprising a step of rotating the bar around its longitudinal axis.

13. An apparatus for ablating awns, hairs and appendages of seeds, the apparatus comprising:
a drum having at least one portion that exposes seeds inside the drum to rotational movement for generating within the drum a stream of seeds rotating one or more times about a longitudinal axis of the drum, and
at least one torch located with respect to the drum such that at least one flame generated by the at least one torch exposes at least one particular location of the stream of seeds to the at least one flame generated by the at least one torch,
wherein the stream of seeds rotates about the longitudinal axis of the drum a plurality of times for periodically exposing the stream of seeds to the at least one flame.

14. The apparatus according to claim 13 wherein the drum comprises a side wall and a rotatable support surface for receiving a plurality of seeds for generating the rotating stream of seeds to expose the stream of seeds to the at least one flame.

15. The apparatus according to claim 14 wherein the drum comprises a side wall, a first open end adapted to receive the plurality of seeds, and a second open end adapted to discharge an ablated plurality of seeds.

16. The apparatus according to claim 15 wherein the support surface comprises a curved rim located adjacent the side wall and the second open end of the drum defining a gap between the curved rim and the side wall adjacent the second open end of the drum, and the apparatus further comprising a fan system located below the drum for delivering an air flow through the gap.

17. The apparatus according to claim 15 further comprising at least one bar abutting an inner surface of the side wall of the drum for agitating the seeds of the stream of seeds.

18. The apparatus according to claim 17 wherein the bar is adapted to be rotated around its longitudinal axis.

19. The apparatus according to claim 13 wherein the flame is a pencil shaped flame of about 38.1 mm to 50.8 mm long.

20. An apparatus for ablating awns, hairs and appendages of seeds, the apparatus comprising:
a drum having a side wall and a rotatable support surface for exposing the seeds inside the drum to rotational movement for generating within the drum a stream of seeds rotating one or more times about the longitudinal axis of the drum, and
at least one torch located with respect to the drum such that at least one flame generated by the at least one torch exposes at least one particular location of the stream of seeds to the at least one flame generated by the at least one torch,
wherein the distance between the at least one flame and the stream of seeds is variable,
wherein the stream of seeds rotates about the longitudinal axis of the drum a plurality of times for periodically exposing the seeds to the at least one flame, and
wherein the apparatus further comprises at least one bar abutting an inner surface of the side wall of the drum for agitating the seeds of the stream of seeds.

* * * * *